United States Patent
Fugel et al.

(10) Patent No.: US 7,318,676 B2
(45) Date of Patent: Jan. 15, 2008

(54) THRUST BEARING COMPRISING A SPACING MEMBER

(75) Inventors: Wolfgang Fugel, Nürnberg (DE); Alexander Reimchen, Herzogenaurach (DE); Walter Wildeshaus, Waigolshausen (DE)

(73) Assignee: INA-Schaeffler KG (DE)

( * ) Notice: Subject to any disclaimer, the term of this patent is extended or adjusted under 35 U.S.C. 154(b) by 99 days.

(21) Appl. No.: 10/545,555

(22) PCT Filed: Jan. 30, 2004

(86) PCT No.: PCT/EP2004/000818

§ 371 (c)(1),
(2), (4) Date: Aug. 12, 2005

(87) PCT Pub. No.: WO2004/074702

PCT Pub. Date: Sep. 2, 2004

(65) Prior Publication Data

US 2006/0193549 A1    Aug. 31, 2006

(30) Foreign Application Priority Data

Feb. 19, 2003   (DE) ............................... 103 06 926

(51) Int. Cl.
*F16C 19/30* (2006.01)
(52) U.S. Cl. .................................................. 384/620
(58) Field of Classification Search ............... 384/626, 384/616–622
See application file for complete search history.

(56) References Cited

U.S. PATENT DOCUMENTS

| | | | |
|---|---|---|---|
| 2,891,828 A | 6/1959 | Winchell | 308/235 |
| 3,934,956 A | 1/1976 | Pitner | 308/174 |
| 4,733,979 A | 3/1988 | Tsuruki | 384/620 |
| 4,981,373 A | 1/1991 | Bando | 384/620 |
| 5,647,675 A | 7/1997 | Metten et al. | 384/620 |
| 5,727,896 A | 3/1998 | Buer et al. | 403/24 |
| 5,967,674 A | 10/1999 | Reubelt et al. | 384/620 |

FOREIGN PATENT DOCUMENTS

| | | |
|---|---|---|
| DE | 35 43 013 A1 | 6/1987 |
| DE | 36 06 707 C2 | 9/1987 |
| DE | 37 12 659 A1 | 10/1987 |
| DE | 39 14 175 A1 | 11/1989 |
| DE | 41 34 369 A1 | 4/1992 |
| DE | 44 07 310 A1 | 9/1995 |
| DE | 199 32 019 A1 | 1/2000 |
| DE | 199 46 333 A1 | 4/2000 |
| EP | 0 449 042 A2 | 10/1991 |
| EP | 0 513 697 A2 | 11/1992 |
| EP | 0 549 824 A1 | 7/1993 |

OTHER PUBLICATIONS

German Search Report 103 06 926.7 Dated Jun. 23, 2003.
International Search Report PCT/EP2004/000818 dated Jun. 4, 2004.

*Primary Examiner*—Thomas R. Hannon
(74) *Attorney, Agent, or Firm*—Ostrolenk, Faber, Gerb & Soffen, LLP

(57) ABSTRACT

An axial bearing having at least one axial runner disk which has a radially extending portion and an axially extending annular flange. A plurality of rollers roll along the radially extending portion of the axial runner disk. A detachable spacing member of annular shape retained on the axial runner disk with the aid of fastening elements, forming a captive axial bearing arrangement. The annular spacing member has a plurality of spaced-apart projecting bosses arranged in the circumferential direction having an axial extent determined by predefined spacing between two connection parts. A second axial runner disk cooperates with the first disk and holds bearing rollers between them. The bearing may be employed in a hydrodynamic torque converter at the stator between the pump wheel and the turbine wheel of the converter.

10 Claims, 7 Drawing Sheets

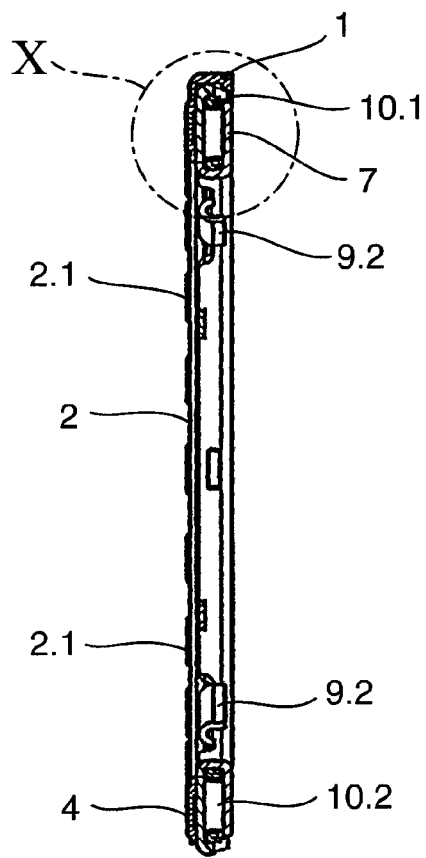
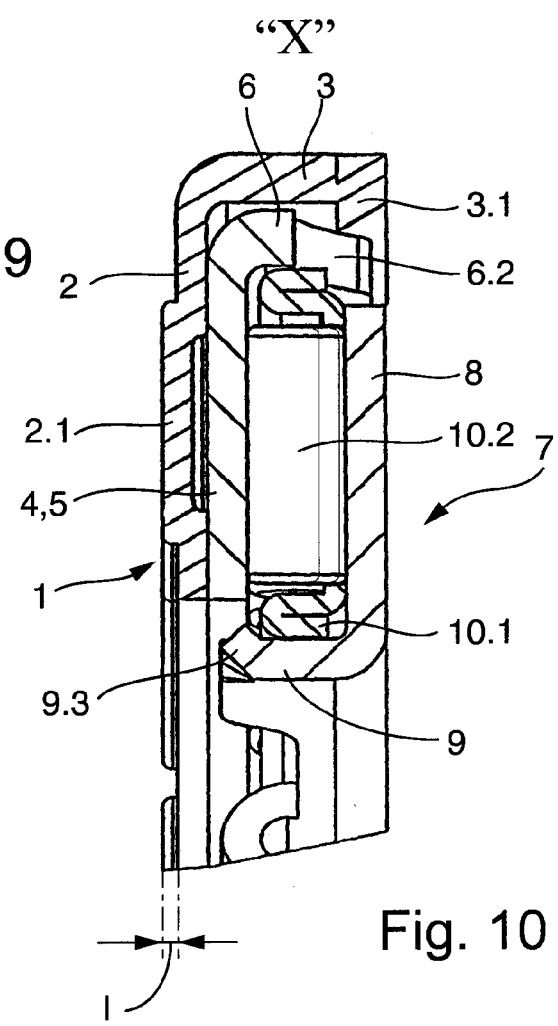
Fig. 9
Fig. 10

THRUST BEARING COMPRISING A SPACING MEMBER

CROSS REFERENCE TO RELATED APPLICATION

The present application is a 35 U.S.C. §§ 371 national phase conversion of PCT/EP2004/000818, filed 30 Jan. 2004, which claims priority of German Application No. 103 06 926.7, filed 19 Feb. 2003. The PCT International Application was published in the German language.

FIELD OF APPLICATION OF THE INVENTION

The invention relates to a spacing member for an axial bearing. The bearing includes at least one axial runner disk which has a radially extending portion and an axially extending annular rim, and may have a second axial runner disk. A plurality of rollers roll along the radially extending portion of the or both axial runner disks. A detachable spacing member of annular shape is retained on the axial runner disk with the aid of fastening elements, forming a captive structural unit is formed.

BACKGROUND TO THE INVENTION

Axial bearings of this type with detachable spacing members are used particularly in vehicle transmissions in the automotive industry. When such transmissions are assembled, such an axial bearing typically lies flat against a first transmission part. The associated other, second, transmission part is connected to the first transmission part by way of the axial bearing. The spacing member is selected after measurements have been carried out during one of the transmission assembly operations, i.e. its correct axial thickness is determined according to the dimensions to be observed for the spaced-apart transmission parts.

Such a generic axial bearing with a spacing member is already known from DE 39 14 175 A1. It is produced from a plastic and has an annular shape. Another generic axial bearing is known from U.S. Pat. No. 4,733,979. The spacing member is again annular and is connected to an axial runner disk. As is shown by FIG. 12 of this prior application, two parts which can be rotated relative to one another are connected to one another by way of this axial bearing, the required distance between the two parts being determined by the axial bearing and by the spacing disk fastened thereto.

However, what happens in practice is that various differences always occur between the parts to be mounted, even in applications of the same type. That in turn means that these production-dictated tolerances, for example within a series of transmissions having the same dimensions, are different in each individual case. In other words, this varying spacing within a transmission series from component to component cannot be compensated by the axial bearing alone. In each individual case, the corresponding transmission has to be measured and the respective bearing has to be provided, depending on the resulting measurement, with a selected spacing member, so that the required tolerance is observed. That in turn means that a large number of spacing members which differ in their axial thickness must be kept available. According to the prior art, these spacing disks are produced from materials which all have a different initial thickness. It follows therefrom that, for tooling reasons alone, such a production of spacing members with different thicknesses is highly expensive.

SUMMARY OF THE INVENTION

The object on which the invention is based is therefore to produce such an assembled axial bearing arrangement in a more cost-effective manner.

According to the invention, the annular spacing member has projecting bosses which are spaced apart in the circumferential direction and which have an axial extent is determined by the spacing to be observed between two connection parts which are to be connected rotatably by means of the axial bearing.

The advantage of the spacing members according to the invention is particularly that, by contrast with the prior art, they can be produced from a starting material of same thickness. It is thus possible using simple means to produce a number of spacing members for axial bearings which, while otherwise being of the same dimensions, have a differing axial extent. The differing axial extent of the bosses is made possible in a simple manner by means of a stamping ram which need only be altered to a small degree. Only one tool is thus necessary for spacing members of the same types but having differing axial extents.

A further essential advantage of the spacing members according to the invention is that they do not have a planar contact face by virtue of the spaced-apart projecting bosses. In this way, the flow of oil through such an axial bearing is significantly improved, such flow being of crucial importance in transmission construction if consumers connected downstream are to be supplied with a corresponding oil pressure.

The bosses may be circular.

The spacing member may be fabricated from a metallic material and the bosses may be produced by a stamping operation.

The spacing member may have three retaining tabs which are spaced apart in the circumferential direction, extend in the axial direction and are provided with a retaining lug which extends in the radial direction. This design ensures that the spacing member bears exactly against the axial bearing.

The retaining tabs are arranged on the outer or on the inner circumference of the annular spacing member. This depends on whether the associated axial bearing is internally or externally guided.

The axially extending rim of the axial runner disk is provided with a plurality of segmentlike protrusions which are spaced apart uniformly in the circumferential direction and extend in the radial direction. The rim has a clearance between each two of the segmentlike protrusions. This design ensures, on the one hand, that the two components are prevented from twisting relative to one another and, on the other hand, that it is possible to hold them firmly together to form a captive structural unit.

Finally, in a specific application of the spacing member according to the invention, such an axial bearing with a fitted-on spacing member may be employed in a hydrodynamic torque converter, in which arrangement a casing which rotates about an axis of rotation is connected to a pump wheel. A turbine wheel which can be rotated about the axis of rotation relative to the pump wheel is arranged axially opposite the pump wheel, and a stator which can be rotated relatively about the axis of rotation is arranged between the pump wheel and the turbine wheel and is supported on the pump wheel and on the turbine wheel within the casing by means of a respective axial bearing. The axial bearing situated between the stator and the pump wheel is provided with the annular spacing member hereof.

The invention will be explained in more detail by way of the exemplary embodiments below.

BRIEF DESCRIPTION OF THE DRAWINGS

In the drawings:

FIG. 9 shows a section through an axial bearing along the line IX-IX in FIG. 7, FIG. 10 shows an enlarged representation of a detail in FIG. 9.

DETAILED DESCRIPTION OF THE DRAWINGS

Figure 1:
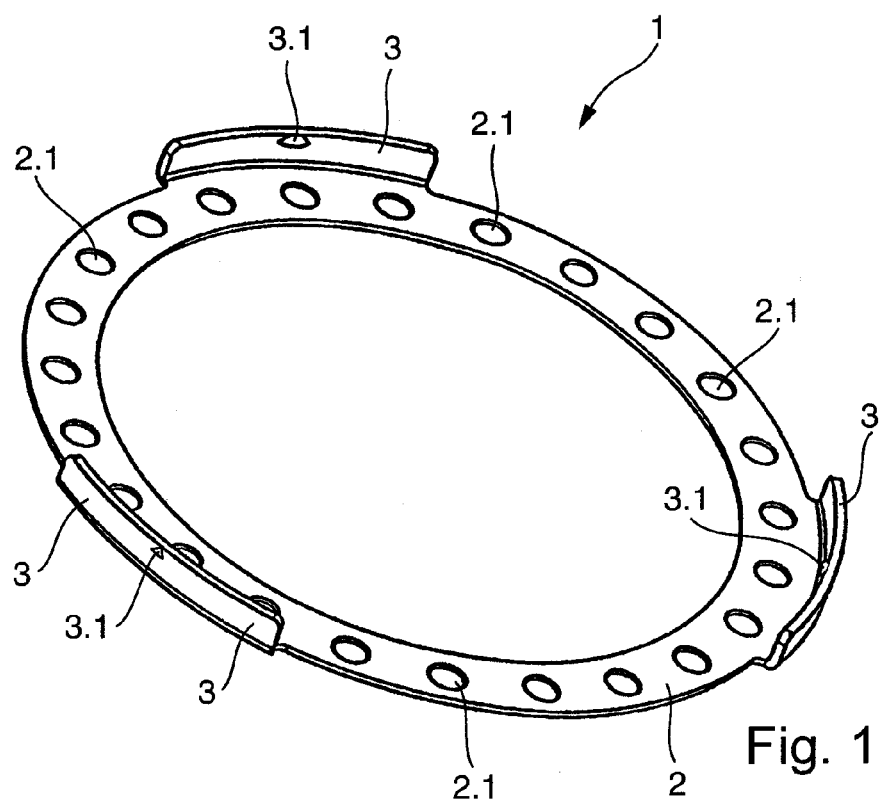
FIG. 1 shows a perspective representation of a spacing member designed according to the invention.
Figure 2:
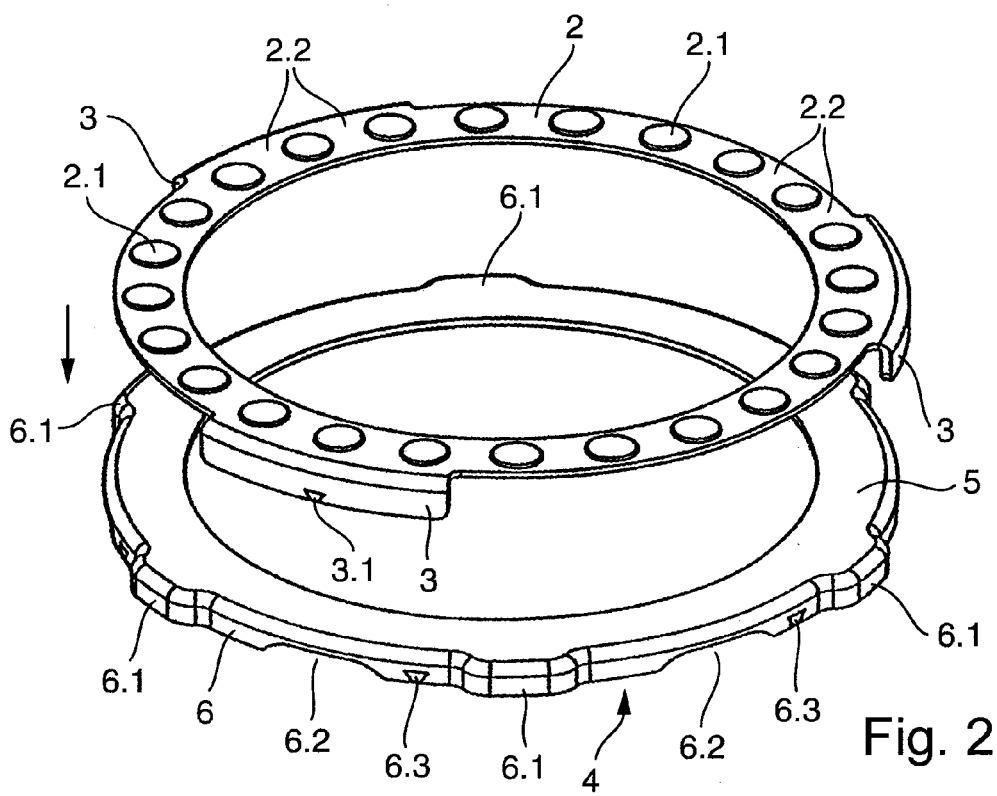
FIG. 2 shows a perspective representation of the spacing member and of an axial runner disk designed according to the invention.

As can be seen from FIGS. 1 and 2, the spacing member 1 according to the invention comprises the annular radial portion 2, which is provided with a plurality of bosses 2.1 spaced apart in the circumferential direction. In the present example, these bosses 2.1 are circular and are produced from the metallic spacing member by material displacement, for example by a stamping operation. The essential nature of the invention is that, while the spacing member 1 is otherwise completely identically dimensioned, these bosses 2.1 on different respective members 1 have a differing axial extent. It is possible to produce from the same starting material a number of spacing members 1 which differ only in the axial extent of the bosses 2.1, the axial length of which is ultimately determined by the spacing between the parts to be mounted. As can further be seen from the stated figures, the radially extending portion 2 of the spacing member 1 is provided with retaining tabs 3 at three uniformly spaced-apart peripheral locations on its outer circumference. These retaining tabs extend in the axial direction and each has a retaining lug 3.1 which points in the radial direction. In the present case, this retaining lug 3.1 is directed radially inwards, since the retaining tabs 3 are arranged on the outer circumference of the radial portion 2. As can be seen from FIG. 2, the spacing member 1 according to the invention does not have a continuous planar contact face. That face is defined by the faces of the axial bosses 2.1. A free space 2.2 is formed between each pair of bosses 2.1 in the circumferential direction. This clearance is of importance particularly in certain applications to allow oil to flow through such a bearing arrangement.

Figure 3:
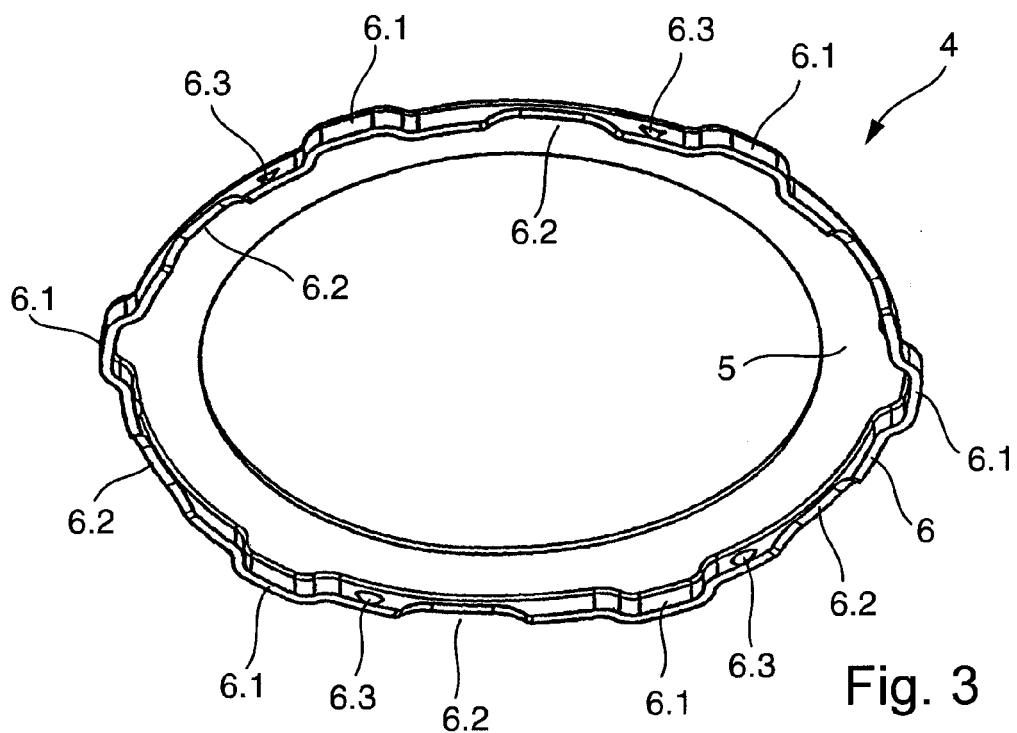
FIG. 3 shows a perspective representation of this axial runner disk from below.

FIGS. 2 and 3 show an axial runner disk 4 onto which the spacing member 1 designed according to the invention is snap-fastened. The axial runner disk 4 comprises the radially extending portion 5, which forms the raceway for rolling bodies, and the rim 6, which extends on the outer circumference in the axial direction. This outer rim 6 is provided with a plurality of segmentlike protrusions 6.1 which are spaced apart in the circumferential direction and extend in the radial direction. In the present case, the axial runner disk 4 is provided with six such protrusions 6.1 of this type since the spacing member 1 has three retaining tabs 3. The axially extending rim 6 of the axial runner disk is provided with clearances 6.2 which are spaced apart uniformly around the circumference and which are in each case enclosed by a segmentlike protrusion 6.1 in the circumferential direction. These clearances 6.2 promote the passage of oil through the bearing arrangement, acting therefore as oil grooves. Adjoining this clearance 6.2 in the rim 6 the latter has radially inwardly directed retaining lugs 6.3 which engage in a positively locking manner behind a rolling bearing cage (not shown).

It can also be discerned from FIG. 2 that the spacing member 1 can be simply clipped onto the axial runner disk 4 in the direction of the arrow, since precentering is provided by the spaced-apart, segmentlike protrusions 6.1. The spacing member 1 is made to bear with its retaining tabs 3 in such a way that the latter engage in the free space between the two spaced-apart, segmentlike protrusions 6.1. It is ensured in this way that mutual twisting of the axial runner disk 4 and the spacing member 1 relative to one another is possible to only a very limited degree. This can only take place until the retaining tabs 3 of the spacing member 1 bear against the segmentlike protrusions 6.1 of the axial runner disk 4. It can additionally be seen from FIG. 2 that, as a result of the threefold arrangement of the retaining tabs 3 on the spacing member 1, the latter can be fitted onto the axial runner disk 4 in a simple manner by springing into place. When the retaining lugs 3.1 of the retaining tabs 3 engage in the clearance 6.2 in the outer rim 6, the axial runner disk 4 and the spacing member 1 are held together captively.

Figure 4:
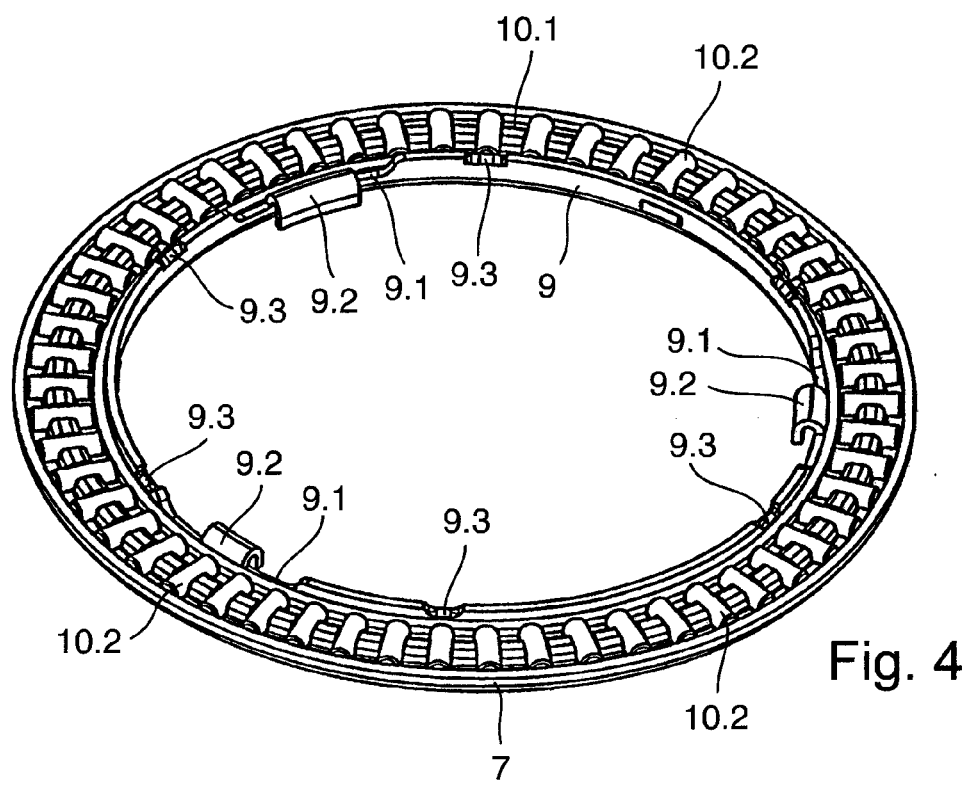
FIG. 4 shows an associated second axial runner disk with an inserted roller ring.

FIG. 4 shows a second axial runner disk 7, the radial portion 8 of which is not visible and constitutes the raceway for the roller ring 10, which is formed by a cage 10.1 and rollers 10.2 accommodated therein. By contrast with the other axial runner disk 4, the second axial runner disk 7 has on its inner circumference a rim 9 which extends in the axial direction and which is provided with clearances 9.1 which are uniformly spaced apart in the circumferential direction. Arranged in these clearances 9.1 are curved twist-preventing means 9.2 which engage in associated cutouts of a connecting construction (not shown). These clearances also act as oil grooves and promote the passage of lubricant through the bearing. In addition, the inner rim 9 is provided with a plurality of retaining lugs 9.3 which point radially outward and engage behind the cage 10.1 of the roller ring 10, with the result that the two components are held one against the other.

Figure 5:
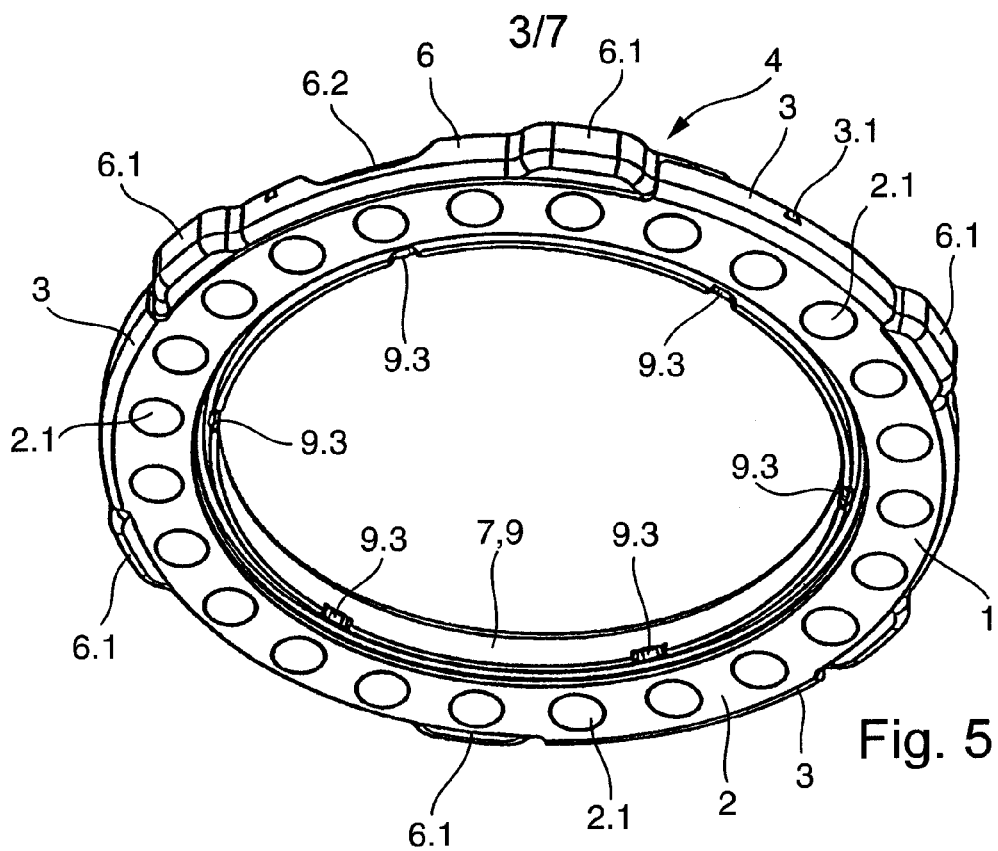
FIGS. 5 and 6 show a perspective representation of a complete axial bearing.
Figure 6:
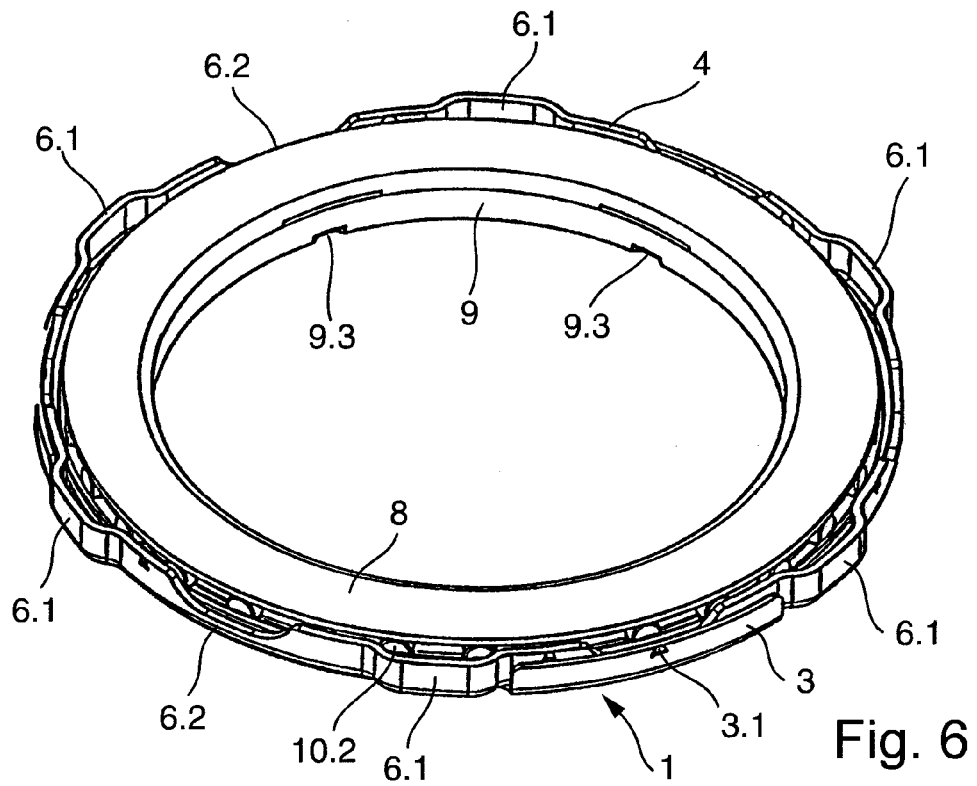
Figure 7:
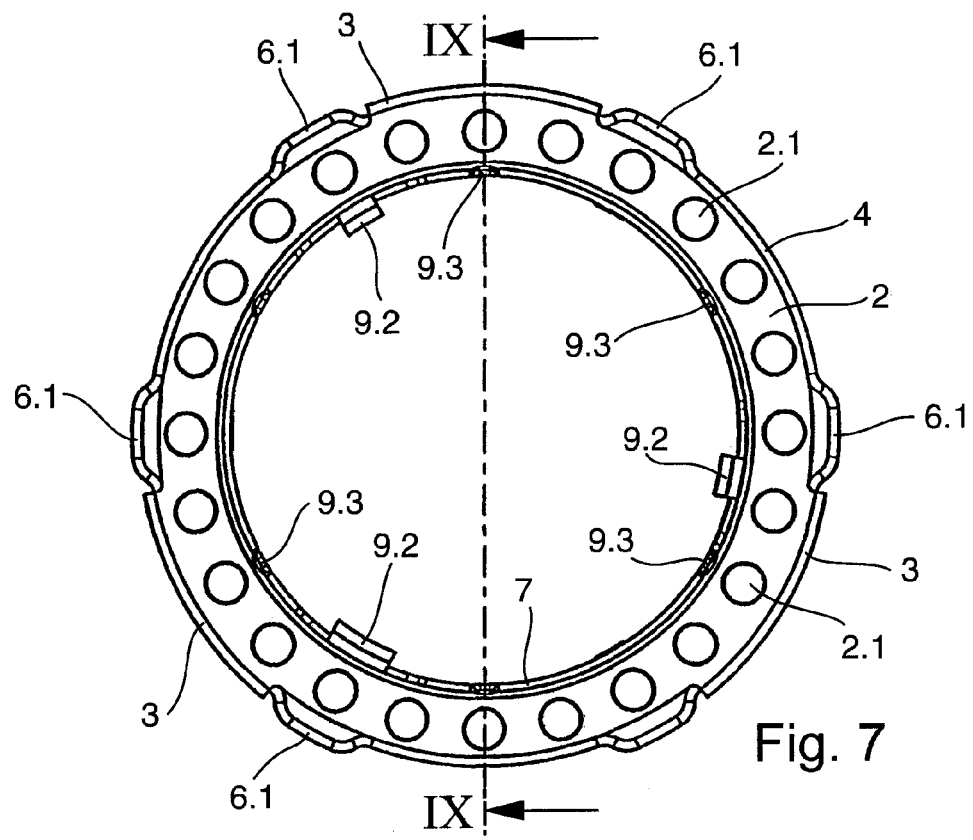
FIGS. 7 and 8 show a plan view of a complete axial bearing according to the invention.
Figure 8:
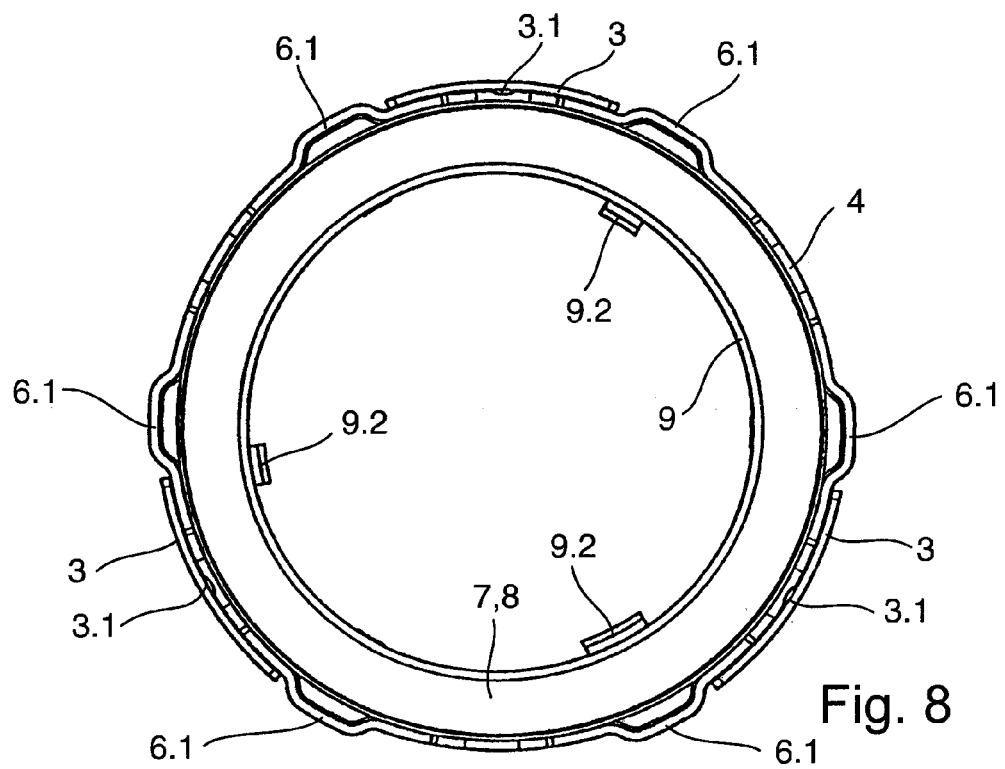

FIGS. 5 and 6 illustratively represent an axial bearing arrangement according to the invention comprised of the first runner disk 4 and of the second runner disk 7, between which disks the roller ring 10 is arranged. Whereas the axial runner disk 4 is equipped with the rim 6 on its outer circumference, the second axial runner disk 7 has the rim 9 on its inner circumference. In this way a self-contained, captive bearing arrangement is formed.

Finally, FIGS. 7, 8, 9 and 10 show the complete axial bearing structural unit in different views or sectional representations. In the text which follows, reference is made particularly to the enlarged representation in FIG. 10. The complete axial bearing structural unit accordingly comprises the roller ring 10, the rollers 10.2 of which are guided in the cage 10.1. The bearing has the two axial runner disks 4 and 7, the axial runner disk 4 being provided with the rim 6 on its outer circumference. In the case of the other runner disk 7, the rim 9 is arranged on the inner circumference. The radial portions 5, 8 of the two runner disks 4, 7 form the associated raceways for the rollers 10.2.

As can further be seen, the rim 9 has its retaining lug 9.3, which is directed radially outward, engaging around the cage 10.2. The spacing member 1 is placed by way of its radial portion 2 on the runner disk 4 on the radial portion 5 thereof and engages by way of the retaining lugs 3.1 of the retaining tabs 3 in the clearance 6.2 in the outer rim 6 of the axial runner disk 4. Bosses 2.1 project in the axial direction from the radial portion 2 of the spacing member 1. These bosses have an axial extent 1 of a different respective value depending on the predefined installation conditions.

Figure 11:
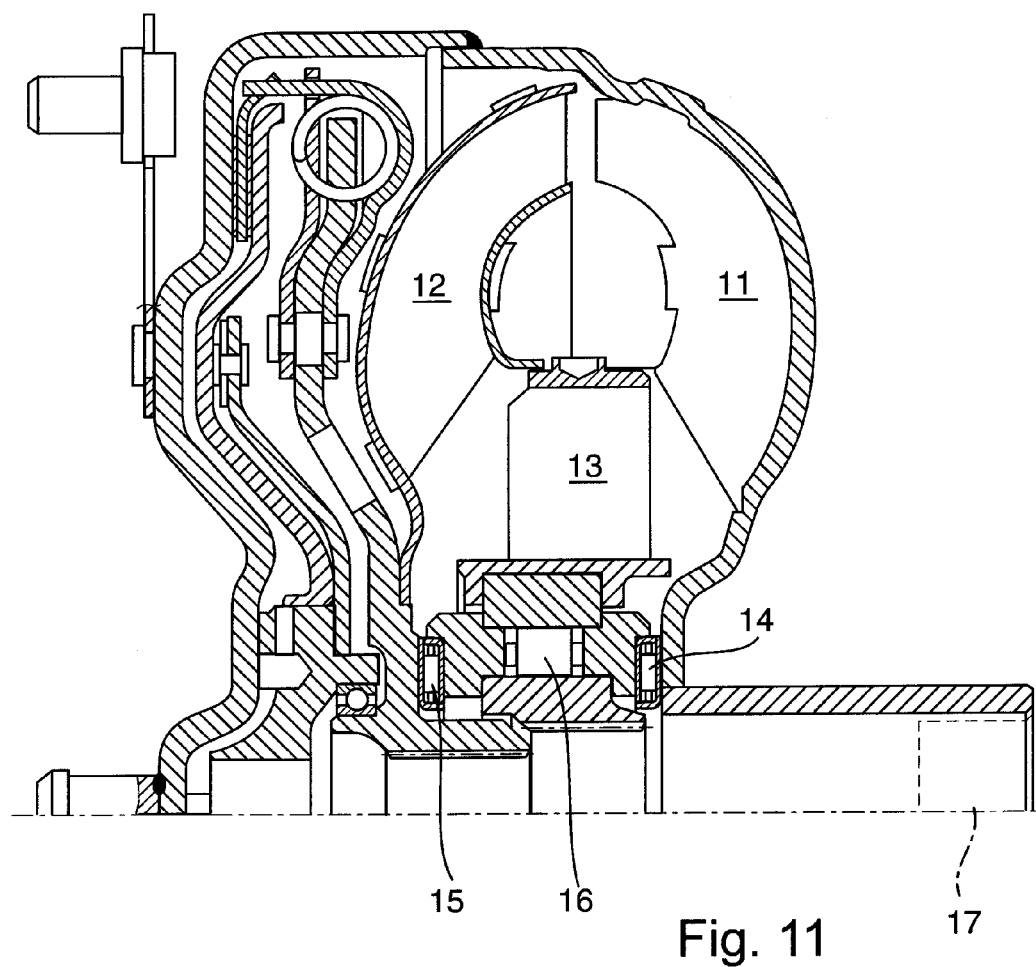
FIG. 11 shows a schematic representation of a torque converter according to the prior art.

An already known torque converter as shown in FIG. 11 is arranged in a transmission casing and includes the pump wheel 11, opposite this the turbine wheel 12, and the stator 13, which is situated between the pump wheel 11 and the turbine wheel 12. Axial bearings 14, 15 are present at both ends of the stator 13. The axial bearing 14 is used to support the rotatable pump wheel 11, while the other axial bearing 15 is used to support the rotatable turbine wheel 12. The pump wheel 11 is in direct connection with a crankshaft of the internal combustion engine, while the turbine wheel 12 is coupled to a transmission input shaft. The stator 13 is connected to the transmission casing via a free wheel 16. As a result of the centrifugal force, the pump wheel 11 conveys the oil outward to the turbine wheel 12 by means of the pump wheel blades and drives said turbine wheel. The blades of the turbine wheel 12 deflect the oil onto the blades of the stator 13, which in turn feeds the oil to the pump wheel 11. The pump wheel, turbine wheel and stator 11, 12, 13 rotate about their common axis of rotation 17.

An exact and detailed description of the structure and the mode of operation of a hydrodynamic torque converter can be omitted at this point because it is sufficiently familiar to a person skilled in the art. Detailed information on hydrodynamic torque converters can be found, for example, in the technical book Viehweg, Handbuch Kraftfahrtzeugtechnik [Motor vehicle engineering manual], Friedrich Viehweg & Sohn Verlagsgesellschaft mbH Braunschweig or in the prior publications DE 35 43 013 A1, DE 36 06 707 C2, DE 37 12 659 A1, DE 41 34 369 A1 and DE 199 46 333 A1.

In this connection, it is also known to a person skilled in the art that hydrodynamic torque converters have a tendency to "swell". What is meant by this is that the converter may be deformed in the axial direction owing to the high oil pressure. This swelling is taken into account in the construction of the converter such that spacing dimensions in the axial direction to be determined by measurement will be observed between the stator 13 and pump wheel 11 on the one hand and between the stator 13 and turbine wheel 12 on the other hand. This is done by employing a spacing disk in the case of the bearing 14 arranged on the right-hand side, this spacing disk not being connected to the bearing 14, however. This spacing disk (not shown) is arranged between the stator 13 and the left-hand axial runner disk of the axial bearing 14. The disadvantage of this is that the guide surface for the axial bearing 14 is lost because of this spacing disk. What may happen in an extreme case is that the bearing will fall from its seat in the case of the converter expanding substantially. During contraction, serious problems with respect to the fallen bearing may arise, possibly leading to premature failure of the converter.

Figure 13:
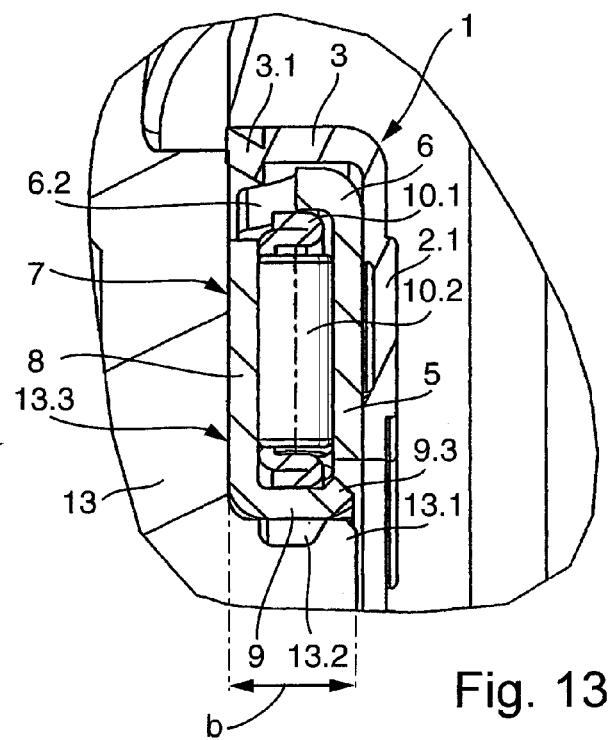
FIGS. 13 and 14 show an enlarged representation of a detail according to FIG. 12.
Figure 12:
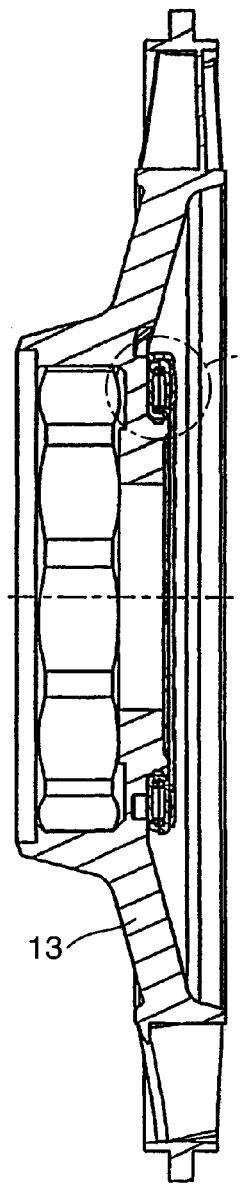
FIG. 12 shows a longitudinal view through a stator of a torque converter with an axial bearing arrangement according to the invention.

FIG. 12 and the enlarged representation of detail in FIG. 13 show longitudinal sections of the stator 13 which is provided with the axial bearing arrangement according to the invention. As can be seen particularly from FIG. 13, the stator 13 is provided with a shoulder 13.1 in at least part of which is made a groove 13.2. In a representation which is not shown, the rim 9 of the axial runner disk 7 is provided with a projection which engages in the groove 13.2, so that the entire bearing arrangement is not able to slide off the stator 13 in the axial direction. As can further be seen, the axial width, denoted by b, of the shoulder 13.1 is one hundred percent available as a guide surface for the axial runner disk 7, i.e. the associated rim 9 of the axial runner disk 7 has its entire axial width seated on the shoulder 13.1 of the stator 13. The associated other axial runner disk 4 is provided with the spacing member 1 in the manner already described, so that the radial portion 2 has its bosses 2.1 extending in the axial direction of a converter cover as shown in FIG. 11.

According to the prior art, the spacing disk (not shown) would be arranged between the axial runner disk 7 and the contact face 13.3 of the stator 13. It can be deduced therefrom that the guide face b for an axial bearing arranged there is reduced, i.e. said axial bearing would be moved to the right. If this spacing disk (not shown) then had to be removed, the entire axial bearing would have to be taken off the stator 13.

By contrast, this is not required in the case of a bearing arrangement according to the invention, since the spacing member 1 is oriented in the direction of the component to be supported. If it were then found that the spacing member 1 was used in an unsatisfactory width, i.e. with an incorrect axial extent of the bosses 2.1, all that is required is to remove the spacing member 1 and not the entire bearing arrangement as in the case of the prior art. The axial bearing arrangement shown in FIG. 13 is internally guided, i.e. the axial bearing has its inner diameter resting on the stator 13. In this case, the design then has to be such that the spacing member 1 is provided with the retaining tabs 3 on its outer circumference.

Figure 14:
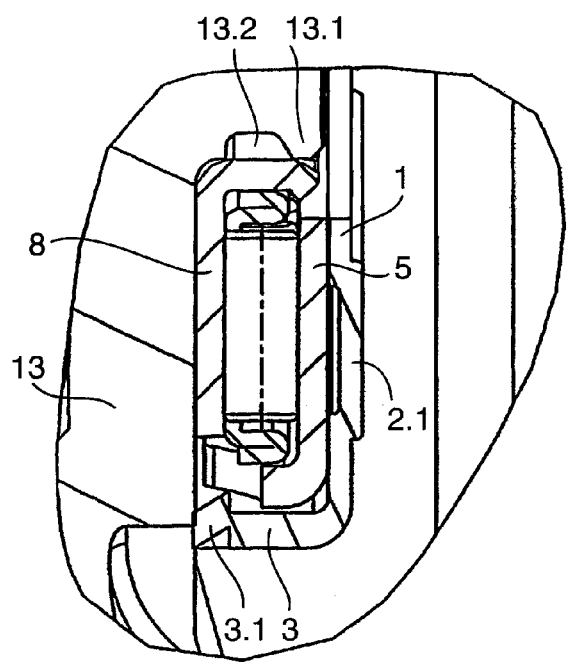

Finally, FIG. 14 shows a stator 13 which bears an externally guided axial bearing. What is meant thereby is that this axial bearing arrangement has its axial runner disk 7 supported on an outer shoulder 13.1. Consequently, the spacing member 1 is provided with retaining tabs 3 on its inner circumference.

The invention claimed is:

1. An axial bearing comprising:
at least one axial runner disk including a radially extending portion extending into an axially extending rim,
a plurality of rollers which roll along the radially extending portion of the axial runner disk,
a detachable annular spacing member retained on the axial runner disk and fastening elements retaining the spacing member on the axial runner disk for forming a captive structural unit, and
projecting bosses on the annular spacing member, the bosses being spaced apart in the circumferential direction and having a selected axial extent related to spacing between two connection parts which are to be rotatably connected by the axial bearing.

2. The axial bearing as claimed in claim 1, wherein the bosses are circular.

3. The axial bearing as claimed in claim 1, wherein the spacing member is of a metallic material and the bosses are produced by a stamping operation.

4. The axial bearing as claimed in claim 1, further comprising retaining tabs on the spacing member, the tabs are spaced apart in the circumferential direction around the spacing member, extend in the axial direction from the spacing member, and each tab has a retaining lug which extends in the radial direction.

5. The axial bearing as claimed in claim 4, wherein there are three of the retaining tabs circumferentially spaced apart.

6. The axial bearing as claimed in claim 1, wherein the annular spacing member has an outer and an inner circumference and the retaining tabs are arranged on at least one of the outer and the inner circumference of the annular spacing member.

7. The axial bearing as claimed in claim 1, further comprising a plurality of segmentlike protrustions on the axially extending rim of the axial runner disk, the protrusions are spaced apart in the circumferential direction and each protrusion extends in the radial direction, the rim having a respective clearance between each two successive segmentlike protrusions.

8. The axial bearing as claimed in claim 1, further comprising:
    a second annular runner disk, with the at least one and the second disks positioned on respective axially opposite sides of the rollers and defining races for the rollers; the second disk also having an axially extending rim, and the rims being placed for radially retaining the rollers between the circular disks and the races thereof;
    the spacing member being axially outward of the at least one disk away from the second disk, and the bosses extending axially outward from the at least one disk.

9. The axial bearing as claimed in claim 1, wherein the axially extending rim is circular.

10. A hydrodynamic torque converter, comprising:
    a casing which is rotatable about a respective axis of rotation, a pump wheel to which the casing is connected;
    a turbine wheel which is rotatable about the axis of rotation relative to the pump wheel and is arranged axially opposite the pump wheel
    a stator which is rotatable relatively to the turbine wheel about the axis of rotation, and is arranged between the pump wheel and the turbine wheel; and
    the axial bearing as claimed in claim 1 supporting the stator on the pump wheel and on the turbine wheel and within the casing, wherein the axial bearing is situated between the stator and the pump wheel and the annular spacing member is on the bearing.

* * * * *